United States Patent
Baumgarte

(10) Patent No.: US 11,232,659 B2
(45) Date of Patent: Jan. 25, 2022

(54) TAMPER DETECTION IN A STATIONARY CREDENTIAL READER DEVICE

(71) Applicant: Schlage Lock Company LLC, Carmel, IN (US)

(72) Inventor: Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 96 days.

(21) Appl. No.: 16/852,018

(22) Filed: Apr. 17, 2020

(65) Prior Publication Data

US 2021/0327176 A1    Oct. 21, 2021

(51) Int. Cl.
| | | |
|---|---|---|
| *G08B 21/00* | (2006.01) | |
| *G07C 9/00* | (2020.01) | |
| *G06N 20/00* | (2019.01) | |
| *G06F 21/86* | (2013.01) | |
| *G08B 13/02* | (2006.01) | |
| *H04L 12/40* | (2006.01) | |

(52) U.S. Cl.
CPC ......... *G07C 9/00309* (2013.01); *G06F 21/86* (2013.01); *G06N 20/00* (2019.01); *G08B 13/02* (2013.01); *H04L 12/40052* (2013.01); *G07C 2009/00507* (2013.01)

(58) Field of Classification Search
CPC ...... G07C 9/00309; G07C 2009/00507; G06N 20/00; H04L 12/4011
USPC ....................................................... 340/5.61
See application file for complete search history.

(56) References Cited

U.S. PATENT DOCUMENTS

| | | | |
|---|---|---|---|
| 5,686,890 | A | 11/1997 | Ko |
| 6,008,726 | A | 12/1999 | Hagen |
| 7,741,969 | B2 | 6/2010 | Linford |
| 8,111,157 | B2 | 2/2012 | Diener et al. |
| 8,680,982 | B2 | 3/2014 | Trundle et al. |

(Continued)

FOREIGN PATENT DOCUMENTS

| | | |
|---|---|---|
| WO | 2015175697 A1 | 11/2015 |
| WO | 2015187731 A1 | 12/2015 |

OTHER PUBLICATIONS

Secure Multi-Domain Smart Card Reader, Document No. HDC08694 Rev 2.1, HighSecLabs, 2015, 2 pages.

*Primary Examiner* — Mark S Rushing
(74) *Attorney, Agent, or Firm* — Taft Stettinius & Hollister LLP

(57) ABSTRACT

A wall-mounted credential reader device according to one embodiment is adapted to be secured to a wall of a building and includes a credential reader adapted to receive credential data from credential devices presented to the wall-mounted credential reader device, an inertial sensor that generates sensor data indicative of an acceleration of the wall-mounted credential reader device, a processor, and a memory including a plurality of instructions stored thereon that, in response to execution by the processor, causes the wall-mounted credential reader device to receive sensor data generated by the inertial sensor, compare the received sensor data to reference data indicative of an acceleration of the wall-mounted credential reader device when the wall-mounted credential reader device is not moving, and generate a tamper alert in response to the comparison indicating that a deviation of the received sensor data from the reference data exceeds a threshold.

18 Claims, 5 Drawing Sheets

(56) References Cited

U.S. PATENT DOCUMENTS

| | | | |
|---|---|---|---|
| 9,097,037 B2 | 8/2015 | McKibben et al. | |
| 2008/0055040 A1 | 3/2008 | Lizza et al. | |
| 2012/0133511 A1* | 5/2012 | Blum | G08B 13/06 340/541 |
| 2013/0321150 A1* | 12/2013 | Koenig | G08B 25/08 340/541 |
| 2013/0327142 A1 | 12/2013 | Hogan et al. | |
| 2013/0335222 A1* | 12/2013 | Comerford | E05B 65/00 340/542 |
| 2014/0266674 A1* | 9/2014 | Nye | G08B 29/046 340/507 |
| 2016/0189533 A1* | 6/2016 | Modi | G08B 13/2491 340/507 |
| 2016/0197893 A1* | 7/2016 | Wendling | G06F 21/86 713/168 |
| 2016/0213934 A1* | 7/2016 | Shen | B81B 7/0087 |

\* cited by examiner

TAMPER DETECTION IN A STATIONARY CREDENTIAL READER DEVICE

BACKGROUND

Access control systems typically involve the use of credentials to manage the operation of an access control device (e.g., an electronic lock device). Such credentials may be assigned to a particular user or device and are often physical in nature, forming at least a portion of, for example, a smartcard, proximity card, key fob, token device, or mobile device. Certain access control systems include a stationary (e.g., wall-mounted) credential reader on the unsecure side of a door/passageway at which the user presents his or her credential to gain access through the door/passageway.

Residing on the unsecure side of the door, the credential reader is susceptible to tampering by malicious actors. As such, various attempts have been made to detect and/or deter tamper events. Today, reader tamper detection is primarily done using infrared light beams. In typical orientations, the infrared light beam is passing through a space (e.g., air). However, when the reader is properly mounted (e.g., on the wall), there is a piece of material that blocks the beam. As long as the infrared beam is not present in the infrared light receiver, the reader infers that no tampering has occurred. However, in practice, malicious actors use simple techniques such as using spray foam to block the infrared beam during tampering, thereby defeating the security mechanism.

SUMMARY

One embodiment is directed to a unique system, components, and methods for tamper detection in a stationary credential reader devices. Other embodiments are directed to apparatuses, systems, devices, hardware, methods, and combinations thereof for tamper detection in stationary (e.g., wall-mounted) credential reader devices.

According to an embodiment, a wall-mounted credential reader device may be adapted to be secured to a wall of a building and may include a credential reader adapted to receive credential data from credential devices presented to the wall-mounted credential reader device, an inertial sensor that generates sensor data indicative of an acceleration of the wall-mounted credential reader device, a processor, and a memory comprising a plurality of instructions stored thereon that, in response to execution by the processor, causes the wall-mounted credential reader device to receive sensor data generated by the inertial sensor, compare the received sensor data to reference data indicative of an acceleration of the wall-mounted credential reader device when the wall-mounted credential reader device is not moving, and generate a tamper alert in response to the comparison indicating that a deviation of the received sensor data from the reference data exceeds a threshold.

In some embodiments, to compare the received sensor data to the reference data may include to reduce signal noise associated with movement of the building from the received sensor data.

In some embodiments, to reduce the signal noise may include to apply a low pass filter to the received sensor data.

In some embodiments, to reduce the signal noise may include to use a heuristic to learn signal characteristics associated with movement of the building.

In some embodiments, to generate the tamper alert may include to generate the tamper alert in response to the comparison indicating that the deviation of the received sensor data from the reference data exceeds the threshold for at least a threshold period of time.

In some embodiments, the credential reader may be electrically coupled to a peripheral controller.

In some embodiments, the inertial sensor may be or may include an accelerometer.

In some embodiments, the inertial sensor may be or may include a gyroscope.

According to another embodiment, an access control system may include a peripheral controller configured to control access through a passageway and a wall-mounted credential reader device adapted to be secured to a wall of a building. The wall-mounted credential reader device may include a credential reader electrically coupled to the peripheral controller and adapted to receive credential data from credential devices presented to the wall-mounted credential reader device, an inertial sensor that generates sensor data indicative of an acceleration of the wall-mounted credential reader device, a processor, and a memory comprising a plurality of instructions stored thereon that, in response to execution by the processor, causes the wall-mounted credential reader device to receive sensor data generated by the inertial sensor, compare the received sensor data to reference data indicative of an acceleration of the wall-mounted credential reader device when the wall-mounted credential reader device is not moving, and generate a tamper alert in response to the comparison indicating that a deviation of the received sensor data from the reference data exceeds a threshold.

In some embodiments, to compare the received sensor data to the reference data may include to reduce signal noise associated with movement of the building from the received sensor data.

In some embodiments, to reduce the signal noise may include to apply a low pass filter to the received sensor data.

In some embodiments, to reduce the signal noise may include to use a heuristic to learn signal characteristics associated with movement of the building.

In some embodiments, to generate the tamper alert may include to generate the tamper alert in response to the comparison indicating that the deviation of the received sensor data from the reference data exceeds the threshold for at least a threshold period of time.

In some embodiments, the inertial sensor may be or may include an accelerometer.

In some embodiments, the inertial sensor may be or may include a gyroscope.

In some embodiments, the peripheral controller may further include an output relay electrically coupled to a lock mechanism, and the peripheral controller may be configured to transmit a control signal to the output relay that is transmitted to the lock mechanism to cause the lock mechanism to unlock.

In some embodiments, the access control system may further include an electric strike electrically coupled to the peripheral controller.

In some embodiments, the peripheral controller may be configured to receive the tamper alert from the wall-mounted credential reader device and transmit an alert message to a remote device in response to the tamper alert.

In some embodiments, the peripheral controller may be configured to receive the tamper alert from the wall-mounted credential reader device and generate an audit message indicative of a detected tamper event in response to the tamper alert.

In some embodiments, to generate the tamper alert may include to generate a UART bus message indicative of a detected tamper event, and the peripheral controller may be configured to receive the UART bus message.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
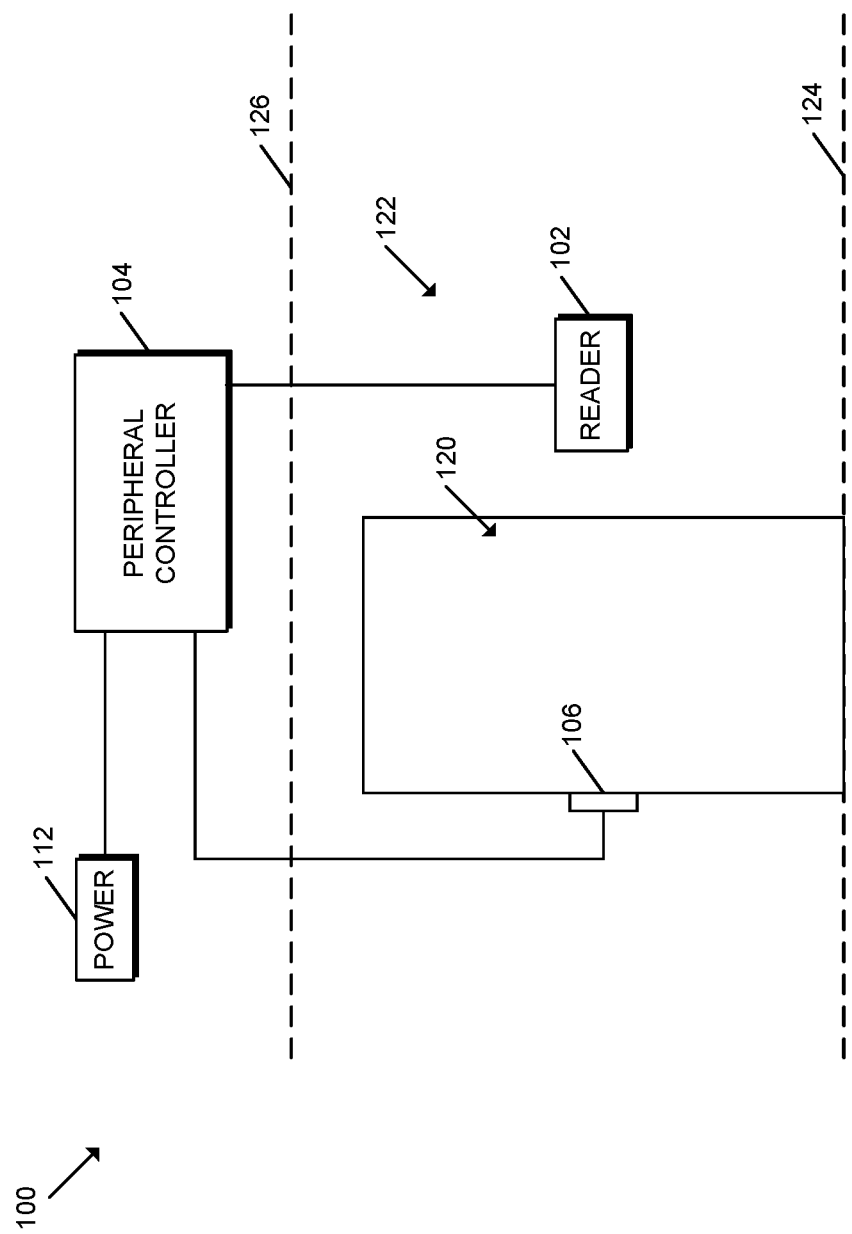
FIGS. 1 and 2 are simplified block diagrams of at least one embodiment of an access control system for tamper detection in a credential reader device.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Figure 2:
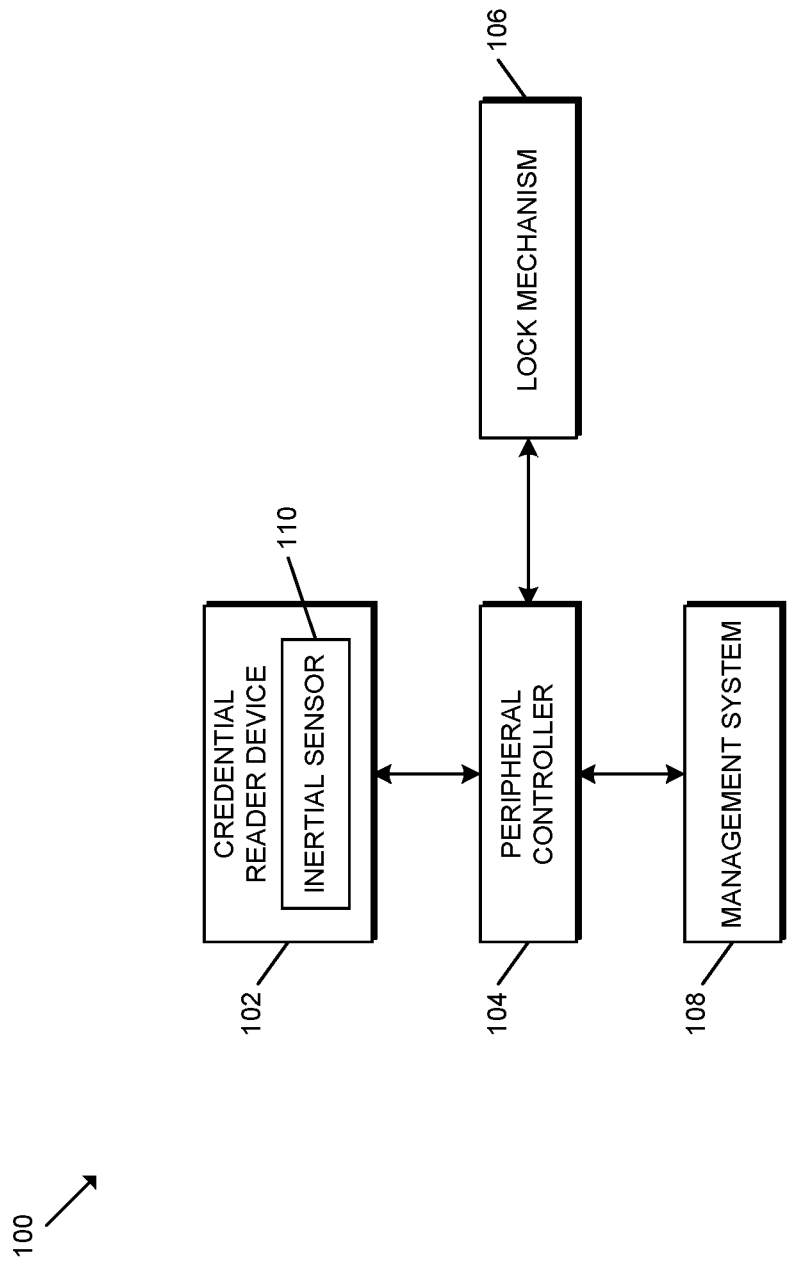

Referring now to FIGS. 1 and 2, the illustrative access control system 100 includes a credential reader device 102, a peripheral controller 104, a lock mechanism 106, and a management system 108. It should be appreciated that each of the credential reader device 102, the peripheral controller 104, the lock mechanism 106, and the management system 108 may be embodied as any type of device or collection of devices suitable for performing the functions described herein.

In particular, the access control system 100 may control access to a passageway (e.g., through a barrier 120 defined in a wall 122) to grant or deny user access through the passageway based on a credential presented by the user. As such, the peripheral controller 104 may be electrically and/or communicatively coupled to the credential reader device 102 and configured to make an access control decision based on credential data received from a credential presented by a user to the credential reader device 102 (e.g., based on an access control database that defines access permissions for various users/credentials). Further, the peripheral controller 104 may be electrically and/or communicatively coupled to an electronic lock mechanism 106 (e.g., an electronic lock, door strike, door latch, and/or other suitable lock mechanism) configured to lock/unlock the corresponding passageway barrier 120 (e.g., door, gate, etc.) such that the peripheral controller 104 may instruct or signal (e.g., via a relay) the lock mechanism 106 to permit/deny access through the barrier based on the access control decision. It should be appreciated that the peripheral controller 104 is "peripheral" in the sense that it is not integrated with an electronic lock. That is, in the illustrative embodiment, the peripheral controller 104 is not mounted on the door/barrier 120.

In some embodiments, the peripheral controller 104 may be electrically coupled (e.g., via an output relay of the peripheral controller 104) to an electrical door strike or other lock mechanism 106 that may be controlled to be in a locked state in which the lock mechanism 106 prevents access through the passageway defined by and blocked by the barrier 120 and an unlocked state in which the lock mechanism 106 permits access through the passageway. For example, in some embodiments, in response to determining to grant access, a processor of the peripheral controller 104 may transmit a signal to a corresponding output relay which, in turn, may be transmitted to the lock mechanism 106 to unlock that lock mechanism 106. In some embodiments, the lock mechanism 106 includes a deadbolt, latch bolt, lever, and/or other mechanism adapted to move between the locked and unlocked state and otherwise perform the functions described herein. However, it should be appreciated that the lock mechanism 106 may be embodied as any another mechanism suitable for controlling access through a passageway in other embodiments.

It should be appreciated that the peripheral controller 104 may receive power 112 (e.g., 12-24V) via line power or via Power over Ethernet (PoE) depending on the particular embodiment. However, in other embodiments, it should be appreciated that the peripheral controller 104 may be battery-powered or otherwise powered by an independent power source. Further, the peripheral controller 104 may be electrically coupled to a door position sensor (DPS) and/or other sensors in some embodiments. As shown in FIG. 2, in the illustrative embodiment, the barrier 120 is defined between the floor 124 and the ceiling 126. In such embodiments, the peripheral controller 104 may be located remotely from the lock mechanism 106 (e.g., above the room ceiling 126) and may be configured to communicate with the management system 108 and/or other devices of the access control system 100 via wired/wireless communication as described herein.

The management system 108 may be configured to manage the commissioning of various access control devices (e.g., the peripheral controller 104), manage credentials of the access control system 100, make access control decisions, and/or otherwise perform the functions described herein. For example, the management system 108 may be responsible for ensuring that the access control devices have updated authorized credentials, whitelists, blacklists, device parameters, and/or other suitable data. Additionally, in some embodiments, the management system 108 may receive security data, audit data, raw sensor data, and/or other suitable data from one or more of the access control devices for management of the access control system 100. In some embodiments, one or more of the devices of the management system 108 may be embodied as an online server or a cloud-based server. Further, in some embodiments, the management system 108 may communicate with multiple access control devices at a single site (e.g., a particular building) and/or across multiple sites. That is, in such embodiments, the management system 108 may be configured to receive data from access control devices distributed across a single building, multiple buildings on a single campus, or across multiple locations.

It should be appreciated that the management system 108 may include one or more devices depending on the particular embodiment of the access control system 100. For example, the management system 108 may include a management server, a gateway device, an access control panel, a mobile device, and/or other computing devices depending on the particular embodiment. The functions of the management system 108 described herein may be performed by one or more of those devices in various embodiments. For example, in some embodiments, a management server may perform all of the functions of the management system 108 described herein.

It should be further appreciated that, although the management system 108 is described herein as one or more computing devices outside of a cloud computing environment, in other embodiments, the management system 108 may be embodied as a cloud-based device or collection of devices. Further, in cloud-based embodiments, the management system 108 may be embodied as a server-ambiguous computing solution, for example, that executes a plurality of instructions on-demand, contains logic to execute instructions only when prompted by a particular activity/trigger, and does not consume computing resources when not in use. That is, the management system 108 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the management system 108 described herein. For example, when an event occurs (e.g., data is transferred to the management system 108 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user/process (e.g., via an appropriate interface to the management system 108), the appropriate virtual function(s) may be executed to perform the actions before eliminating the instance of the virtual function(s).

The credential reader device 102 may be embodied as any type of device capable of reading credentials and/or otherwise performing the functions described herein. In the illustrative embodiment, it should be appreciated that the credential reader device 102 is "stationary" in the sense that the credential reader device 102 is not mounted to the barrier 120 or other object intended to endure gross movements (e.g., movements other than typical vibrations/movements associated with environmental conditions). For example, in some embodiments, the credential reader device 102 may be secured to a wall 122 (i.e., wall-mounted), door frame, pole, and/or other fixed structure nearby the barrier 120.

It should be appreciated that the credentials received/processed by the credential reader device 102 may vary depending on the particular embodiment. For example, in some embodiments, one or more credentials may be embodied as a passive credentials having a credential identifier (e.g., a unique ID) stored therein and "passive" in the sense that the credentials are configured to be powered by radio frequency (RF) signals received from a credential reader. In other words, such passive credentials do not have an independent power source but, instead, rely on power that is induced from RF signals transmitted from other devices in the vicinity of the credentials. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, each of the credentials may be embodied as any type of passive or active credential device capable of performing the functions described herein. For example, in some embodiments, one or more of the credentials may be embodied as a virtual credential stored on a mobile device and/or other computing device of a particular user (e.g., for smartcard or proximity card emulation, BLE credentials, etc.).

As described herein, the illustrative credential reader device 102 includes at least one inertial sensor 110 configured to monitor movement (e.g., acceleration) of the credential device 102. In some embodiments, the inertial sensor 110 may be embodied as or include an accelerometer and/or gyroscope. As described in greater detail below, the credential reader device 102 leverages the sensor data generated by the inertial sensor(s) 110 to determine when the stationary credential reader device 102 has moved, thereby triggering a tamper alert. For example, the credential reader device 102 may determine a "steady position" of the credential reader device 102, accounting for gravity and its known direction/value, and generate the tamper alert when a deviation from that state occurs. In some embodiments, the credential reader device 102 may account for normal building movements, vibrations, and/or other environmental forces to ensure that a false positive is not generated. Although the techniques are described herein primarily in reference to a single inertial sensor 110 for simplicity of the description, it should be appreciated that the credential reader device 102 may include and/or leverage sensor data from multiple inertial sensors 110 in some embodiments. It should be further appreciated that, for brevity of the description, references to the sensor data generated by a particular sensor may also include different formats of the sensor data and/or other data/information derived from the sensor data.

In some embodiments, the credential reader device 102 may include additional sensors and analyze the corresponding sensor data to further determine whether a tamper event has occurred. Such sensors may detect various characteristics of the physical environment of the credential reader device 102 (internal and/or external to the credential reader device 102), electrical characteristics of the credential reader device 102, electromagnetic characteristics of the credential reader device 102 or its surroundings, and/or other suitable characteristics. For example, in some embodiments, the credential reader device 102 may include proximity sensors, optical sensors, light sensors, electromagnetic sensors, hall effect sensors, audio sensors, temperature sensors, motion sensor, piezoelectric sensors, cameras, switches (e.g., reed switches, physical switches, etc.), inductive sensors, capacitive sensors, and/or other types of sensors. Of course, the credential reader device 102 may also include components and/or devices configured to facilitate the use of such sensors.

It should be appreciated that each of the credential reader device 102, the peripheral controller 104, and/or the management system 108 may be embodied as one or more computing devices similar to the computing device 300 described below in reference to FIG. 3. For example, in the illustrative embodiment, each of the credential reader device 102, the peripheral controller 104, and the management system 108 includes a processing device 302 and a memory 306 having stored thereon operating logic 308 for execution by the processing device 302 for operation of the corresponding device. Although only one credential reader device 102, one peripheral controller 104, and one management system 108 are shown in the illustrative embodiment of FIGS. 1 and 2, the system 100 may include multiple credential reader devices 102, peripheral controllers 104, and/or management systems 108 in other embodiments.

Figure 3:
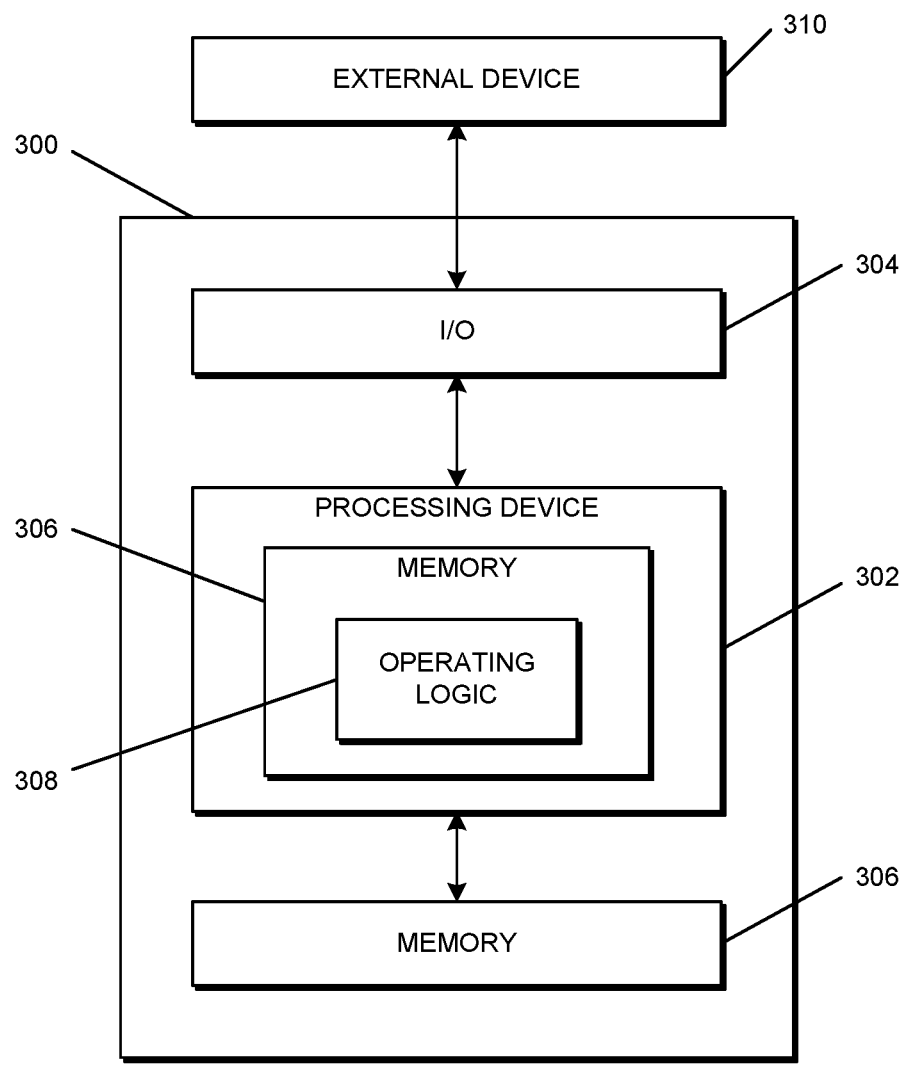
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of a credential reader device, peripheral controller, and/or management system that may be utilized in connection with the credential reader device 102, peripheral controller 104, and/or management system 108 illustrated in FIGS. 1 and 2. Depending on the particular embodiment, the computing device 300 may be embodied as a reader device, peripheral controller, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, BLE, Wi-Fi®, WiMAX, CDMA, LTE, GSM, IP, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the credential reader device 102, the peripheral controller 104, and/or the management system 108. Further, in some embodiments, the external device 310 may be embodied as another computing device, sensor, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
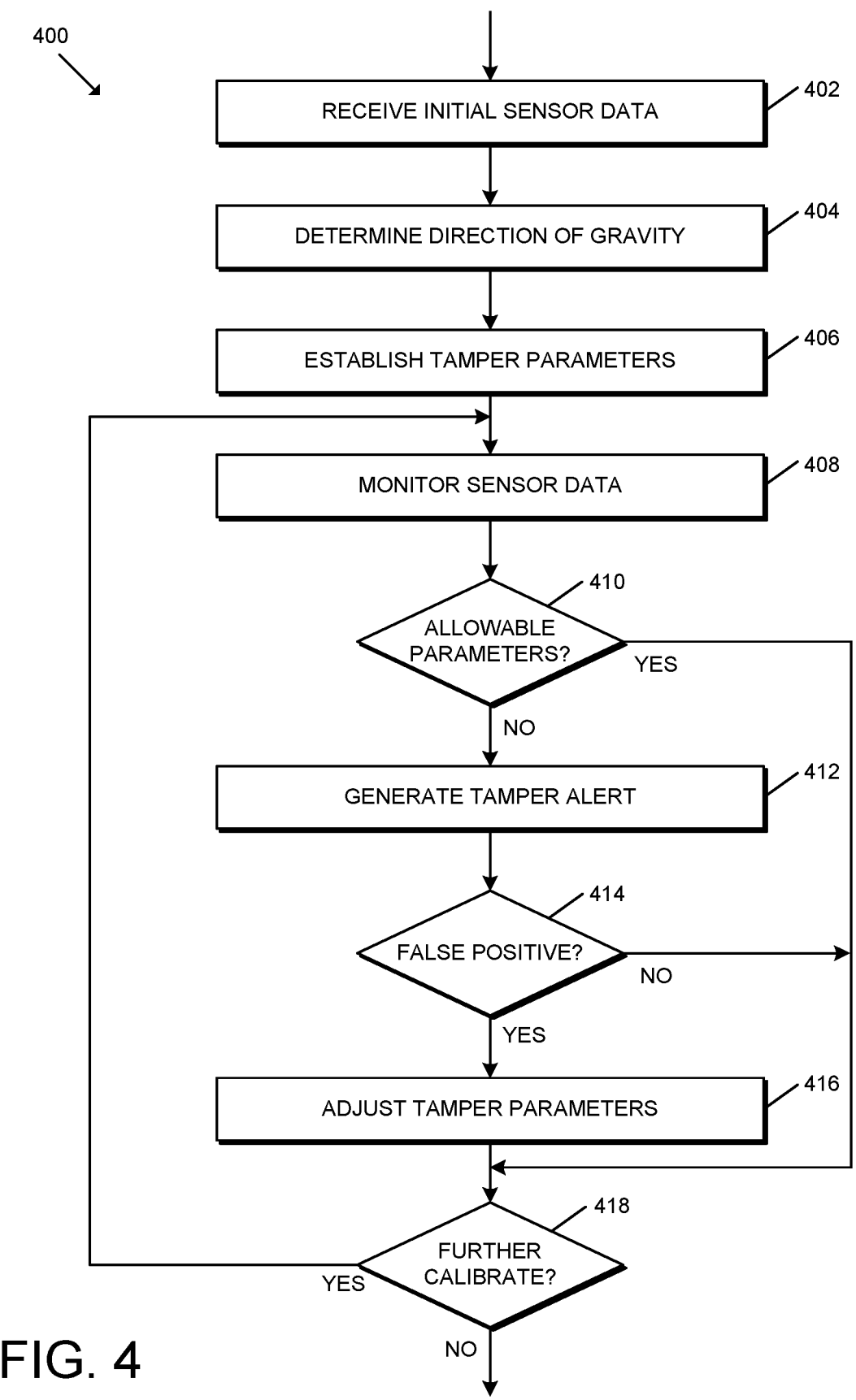
FIG. 4 is a simplified flow diagram of at least one embodiment of a method for calibrating an inertial sensor of the credential reader device.

Referring now to FIG. 4, in use, the credential reader device 102 may execute a method 400 for calibrating at least one inertial sensor 110 of the credential reader device 102. It should be appreciated that the particular blocks of the method 400 are illustrated by way of example, and such blocks may be combined or divided, added or removed, and/or reordered in whole or in part depending on the particular embodiment, unless stated to the contrary.

As described herein, it should be appreciated that buildings (particularly commercial buildings) have natural shaking/vibrations that occur due to people moving through it, operation of equipment, internal/environmental characteristics (e.g., wind), and/or other relevant factors. Although building motion is typically back-and-forth or in a somewhat oscillating pattern (e.g., movement in one direction, followed by movement in an opposite direction of similar magnitude), true tamper events typically involve accelerations skewed in one direction. As such, the techniques described herein allow the credential reader device 102 to calibrate tamper parameters (e.g., during an initial or subsequent setup) to account for those movements inherent in an otherwise stationary credential reader device 102. In doing so, the credential reader device 102 may reduce or eliminate false positives associated with tamper alerts from detected movement. Similarly, in some embodiments, the calibration by the credential reader device 102 may further account for other movements of surrounding structures of the building. For example, in some embodiments, the credential reader device 102 may account for significant wall vibrations (e.g., from college students pounding on the walls or running down the halls) unrelated to a true tamper event. Further, in some embodiments, the calibration of the credential reader device 102 may also account for inadvertent and/or non-tamper physical contact with the credential reader device 102 (e.g., from a passerby inadvertently bumping into or tapping the credential reader device 102).

The illustrative method 400 begins with block 402 in which the credential reader device 102 receives sensor data from the inertial sensor 110. In block 404, the credential reader device 102 determines the direction of gravity. Depending on the particular embodiment, it should be appreciated that the direction of gravity may be predetermined, determined based on the sensor data from the inertial sensor 110, and/or determined based on sensor data generated by another sensor (e.g., magnetometer).

In block 406, the credential reader device 102 establishes one or more default or baseline tamper parameters to be indicative of a tamper event. For example, in some embodiments, the tamper parameters may include one or more acceleration thresholds (e.g., a single threshold, different thresholds for each direction, etc.), which if surpassed is indicative of a tamper event. It should be appreciated that the particular signal characteristics associated with the acceleration thresholds may vary depending on the particular embodiment. For example, in various embodiments, the credential reader device 102 may evaluate the amplitude, absolute value, polarity, and/or other characteristics of the acceleration. Further, in some embodiments, the tamper parameters may further include a time period threshold such that accelerations exceeding the acceleration thresholds are only deemed tamper events if they last at least a threshold period of time or occur multiple times over a period of time. In some embodiments, it should be appreciated that the default tamper parameters may be predefined by the credential reader device 102.

In block 408, the credential reader device 102 monitors the sensor data generated by the inertial sensor 110 (e.g., potentially including data derived therefrom). If the credential reader device 102 determines, in block 410, that the sensor data falls within allowable parameters and therefore is not indicative of a tamper event, the method 400 advances to block 418 in which the credential reader device 102 determines whether to perform further calibration. If so, the method 400 returns to block 408 to continue monitoring the sensor data generated by the inertial sensor 110. However, if no further calibration is to be performed, the method 400 may terminate.

Returning to block 410, if the credential reader device 102 determines that one or more parameters of the sensor data is indicative of a tamper event, the method 400 advances to block 412 in which the credential reader device 102 generates a tamper alert. In block 414, the credential reader device 102 determines whether the tamper alert was a false positive (i.e., not associated with a true tamper event). If not, the method 400 advances to block 418 to determine whether to perform further calibration. However, if the credential reader device 102 determines that a false positive has occurred, the method 400 advances to block 416 in which the credential reader device 102 adjusts one or more of the tamper parameters to account for the false positive, and then advances to block 418 to determine whether to perform further calibration.

It should be appreciated that the credential reader device 102 may use any suitable techniques and/or algorithms to determine whether a false positive has occurred. For example, in some embodiments, an installation technician may provide user feedback and/or the credential reader device 102 may interpret any tamper event detected during a particular calibration phase as a false positive. The particular tamper parameters and/or the manner in which they are modified (if at all) may vary depending on the particular embodiment. For example, in some embodiments, the credential reader device 102 (e.g., automatically/independently and/or via technician feedback) may adjust an acceleration threshold, time period threshold, and/or other threshold to reduce the sensitivity of the tamper detection. Although not described in detail, it should also be appreciated that, in some embodiments, the credential reader device 102 may adjust the tamper parameters even when no tamper event is detected (e.g., by increasing the sensitivity) in an effort to prevent calibration circumstances in which the tamper detection is not sensitive enough.

Although the blocks 402-418 are described in a relatively serial manner, it should be appreciated that various blocks of the method 400 may be performed in parallel in some embodiments.

Figure 5:
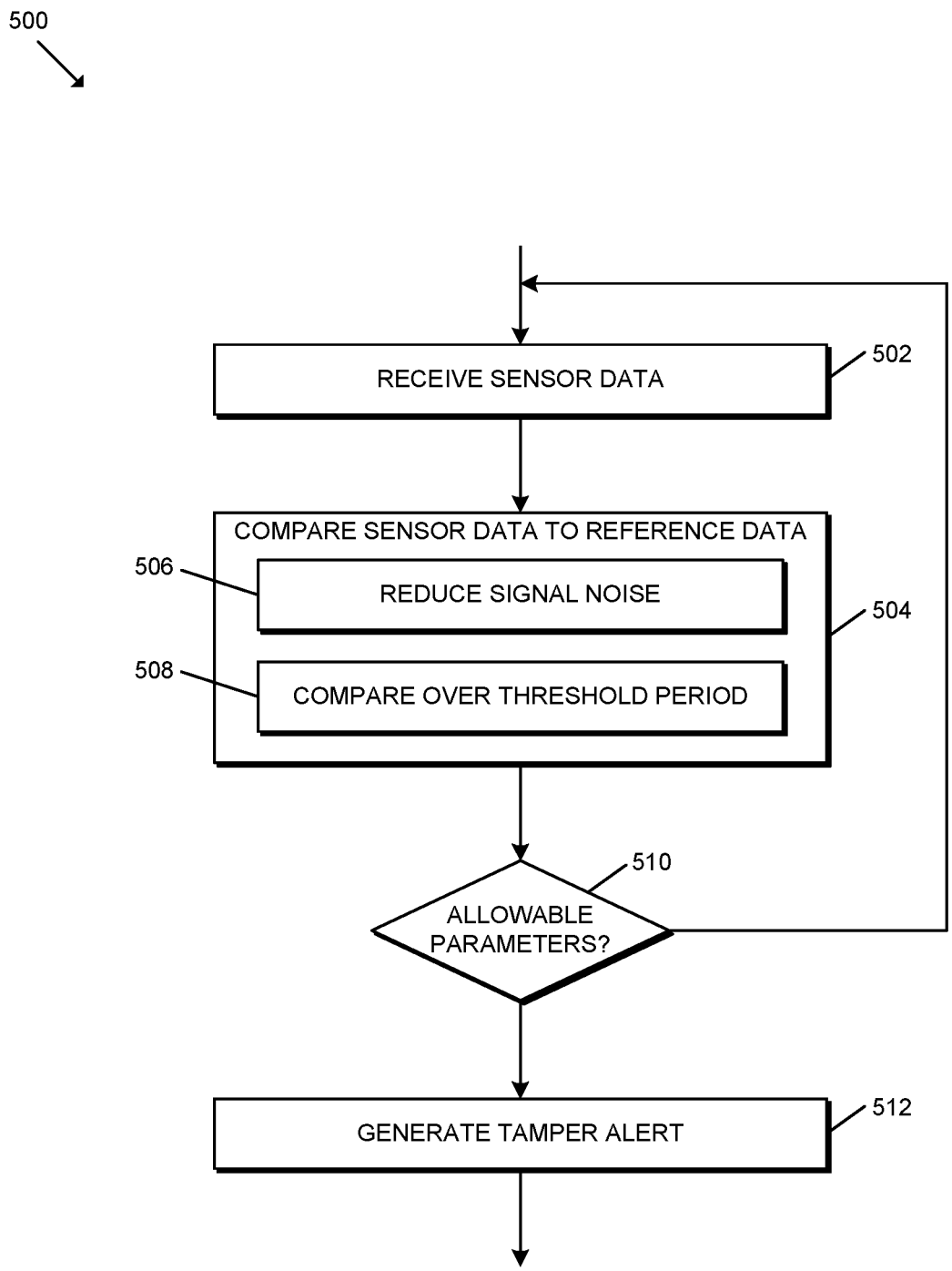
FIG. 5 is a simplified flow diagram of at least one embodiment of a method for detecting a tamper event associated with the credential reader device.

Referring now to FIG. 5, in use, the credential reader device 102 may execute a method 500 for detecting a tamper event associated with the credential reader device 102. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the credential reader device 102 receives sensor data from the inertial sensors 110. In block 504, the credential reader device 102 compares the sensor data (e.g., potentially including data derived therefrom) to reference data, which may be indicative of tamper parameters and/or acceptable operational parameters (e.g., an acceleration of the credential reader device 102). In doing so, in block 506, the credential reader device 102 may reduce signal noise associated with movement of the building and/or other environmental characteristics from the sensor data. In other words, the credential reader device 102 may compare the sensor data directly and/or after having been processed to reduce signal noise. Further, in block 508, the credential reader device 102 may compare the sensor data over a period of time (e.g., a threshold period).

It should be appreciated that the credential reader device 102 may use any suitable filters, techniques, and/or algorithms to reduce the signal noise associated with movement of the building (e.g., vibrations) and/or other environmental characteristics. For example, in some embodiments, the credential reader device 102 may apply a low pass filter to the sensor data. In some embodiments, the credential reader device 102 may use a sliding window technique to sum (or otherwise combine) values over time, which may be compared to the reference data. In another embodiment, the credential reader device 102 may utilize a time delay or threshold such that if movement of the credential reader device 102 is detected and it does not move back approximately to its prior location (e.g., steady state) within a predetermined time period (e.g., 100 ms), the condition may be indicative of a tamper event. As described above, in some embodiments, vibrations associated with the movement of the building may cause the credential reader device 102 to move in a somewhat oscillating pattern. Accordingly in some embodiments, the credential reader device 102 may detect a tamper event in response to the acceleration (or other motion) deviating by a threshold amount (e.g., relative to a baseline reference point) for at least a threshold period of time (e.g., without returning).

Further, in some embodiments, the credential reader device 102 may leverage a heuristic to learn signal characteristics associated with movement of the building (e.g., based on a machine learning algorithm). In such embodiments, the machine learning algorithm(s) leveraged by the credential reader device 102 and/or the system 100 may include one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

In block 510, the credential reader device 102 determines whether the relevant operational parameters are allowable (e.g., consistent with no tamper event) or that a tamper event has occurred. If the parameters are allowable, the method 500 returns to block 502 in which the credential reader device 102 continues to receive and evaluate sensor data for potential tamper events. Otherwise, the method 500 advances to block 512 in which the credential reader device 102 generates a tamper alert. It should be appreciated that the tamper alert may be embodied in any suitable form and/or be transmitted to the peripheral controller 104 in any suitable way. For example, in some embodiments, the credential reader device 102 may transmit the tamper alert as a bus message (e.g., as a UART bus message) that indicates that a tamper event has occurred, whereas in other embodiments, the credential reader device 102 may simply transmit the existence (or non-existence) of a tamper event to the peripheral controller 104 as a high/low signal output (e.g., voltage output).

It should be further appreciated that the manner in which the peripheral controller 104 responds to the tamper event may vary depending on the particular embodiment. For example, in some embodiments, the peripheral controller 104 may generate an audit message indicating characteristics associated with the tamper event (e.g., time/day, etc.), which may be stored to the peripheral controller 104. Further, in some embodiments, the peripheral controller 104 may transmit an alert message to a remote device (e.g., the management system 108, on site security personnel, law enforcement agencies, etc.) that indicates that a tamper event has occurred or is in process in real time. In some embodiments, the peripheral controller 104 may also permanently or temporarily disable the credential reader device 102. Alternatively, the peripheral controller 104 may allow the credential reader device 102 to remain enabled while discontinuing performing access control decisions on behalf of the credential reader device 102 (e.g., such that the bad actor is not alerted that the tamper event has been triggered). In some embodiments, the credential reader device 102 itself may generate an audible or visual alert to avert bad actors.

Although the blocks 502-512 are described in a relatively serial manner, it should be appreciated that various blocks of the method 500 may be performed in parallel in some embodiments.

What is claimed is:

1. A wall-mounted credential reader device adapted to be secured to a wall of a building, the wall-mounted credential reader device comprising:
   a credential reader adapted to receive credential data from credential devices presented to the wall-mounted credential reader device;
   an inertial sensor that generates sensor data indicative of an acceleration of the wall-mounted credential reader device;
   a processor; and
   a memory comprising a plurality of instructions stored thereon that, in response to execution by the processor, causes the wall-mounted credential reader device to:
   receive sensor data generated by the inertial sensor;
   compare the received sensor data to reference data indicative of an acceleration of the wall-mounted credential reader device when the wall-mounted credential reader device is not moving; and
   generate a tamper alert in response to the comparison indicating that a deviation of the received sensor data from the reference data exceeds a threshold, wherein to compare the received sensor data to the reference data comprises to reduce signal noise associated with movement of the building from the received sensor data.

2. The wall-mounted credential reader device of claim 1, wherein to reduce the signal noise comprises to apply a low pass filter to the received sensor data.

3. The wall-mounted credential reader device of claim 1, wherein to reduce the signal noise comprises to use a heuristic to learn signal characteristics associated with movement of the building.

4. The wall-mounted credential reader device of claim 1, wherein to generate the tamper alert comprises to generate the tamper alert in response to the comparison indicating that the deviation of the received sensor data from the reference data exceeds the threshold for at least a threshold period of time.

5. The wall-mounted credential reader device of claim 1, wherein the credential reader is electrically coupled to a peripheral controller.

6. The wall-mounted credential reader device of claim 1, wherein the inertial sensor comprises an accelerometer.

7. The wall-mounted credential reader device of claim 1, wherein the inertial sensor comprises a gyroscope.

8. An access control system, comprising:
   a peripheral controller configured to control access through a passageway; and
   a wall-mounted credential reader device adapted to be secured to a wall of a building, the wall-mounted credential reader device comprising:
   a credential reader electrically coupled to the peripheral controller and adapted to receive credential data from credential devices presented to the wall-mounted credential reader device;
   an inertial sensor that generates sensor data indicative of an acceleration of the wall-mounted credential reader device;
   a processor; and
   a memory comprising a plurality of instructions stored thereon that, in response to execution by the processor, causes the wall-mounted credential reader device to:
   receive sensor data generated by the inertial sensor;
   compare the received sensor data to reference data indicative of an acceleration of the wall-mounted credential reader device when the wall-mounted credential reader device is not moving; and
   generate a tamper alert in response to the comparison indicating that a deviation of the received sensor data from the reference data exceeds a threshold, wherein to compare the received sensor data to the reference data comprises to reduce signal noise associated with movement of the building from the received sensor data.

9. The access control system of claim 8, wherein to reduce the signal noise comprises to apply a low pass filter to the received sensor data.

10. The access control system of claim 8, wherein to reduce the signal noise comprises to use a heuristic to learn signal characteristics associated with movement of the building.

11. The access control system of claim 8, wherein to generate the tamper alert comprises to generate the tamper alert in response to the comparison indicating that the deviation of the received sensor data from the reference data exceeds the threshold for at least a threshold period of time.

12. The access control system of claim 8, wherein the inertial sensor comprises an accelerometer.

13. The access control system of claim 8, wherein the inertial sensor comprises a gyroscope.

14. The access control system of claim 8, wherein the peripheral controller further comprises an output relay electrically coupled to a lock mechanism; and
   wherein the peripheral controller is configured to transmit a control signal to the output relay that is transmitted to the lock mechanism to cause the lock mechanism to unlock.

15. The access control system of claim 8, further comprising an electric strike electrically coupled to the peripheral controller.

16. The access control system of claim 8, wherein the peripheral controller is configured to (i) receive the tamper alert from the wall-mounted credential reader device and (ii) transmit an alert message to a remote device in response to the tamper alert.

17. The access control system of claim 8, wherein the peripheral controller is configured to (i) receive the tamper alert from the wall-mounted credential reader device and (ii) generate an audit message indicative of a detected tamper event in response to the tamper alert.

18. The access control system of claim 8, wherein to generate the tamper alert comprises to generate a UART bus message indicative of a detected tamper event; and wherein the peripheral controller is configured to receive the UART bus message.

\* \* \* \* \*